(12) United States Patent
Mehas (10) Patent No.: US 11,374,440 B2
(45) Date of Patent: Jun. 28, 2022

(54) WIRELESS POWER CHARGING

(71) Applicant: Renesas Electronics America Inc., Milpitas, CA (US)

(72) Inventor: Gustavo Mehas, Mercer Island, WA (US)

(73) Assignee: Renesas Electronics America Inc., Milpitas, CA (US)

( * ) Notice: Subject to any disclaimer, the term of this patent is extended or adjusted under 35 U.S.C. 154(b) by 88 days.

(21) Appl. No.: 16/945,601

(22) Filed: Jul. 31, 2020

(65) Prior Publication Data

US 2022/0037935 A1 Feb. 3, 2022

(51) Int. Cl.
*H02J 50/80* (2016.01)
*H02J 50/12* (2016.01)
*H02J 50/60* (2016.01)

(52) U.S. Cl.
CPC ............. *H02J 50/80* (2016.02); *H02J 50/12* (2016.02); *H02J 50/60* (2016.02)

(58) Field of Classification Search
None
See application file for complete search history.

(56) References Cited

U.S. PATENT DOCUMENTS

| | | | |
|---|---|---|---|
| 4,953,068 A | 8/1990 | Henze | |
| 6,548,985 B1 | 4/2003 | Hayes et al. | |
| 2003/0040291 A1 | 2/2003 | Brewer | |
| 2010/0026390 A1* | 2/2010 | Koizumi | H03F 3/245 |
| | | | 330/296 |
| 2010/0148723 A1 | 6/2010 | Cook et al. | |
| 2010/0219757 A1 | 9/2010 | Benzerrouk et al. | |
| 2010/0225173 A1 | 9/2010 | Aoyama et al. | |
| 2011/0254377 A1 | 10/2011 | Wildmer et al. | |
| 2012/0127765 A1 | 5/2012 | Maruyama et al. | |
| 2013/0147280 A1 | 6/2013 | Oettinger | |
| 2013/0257168 A1* | 10/2013 | Singh | H02J 50/12 |
| | | | 307/104 |
| 2013/0257360 A1 | 10/2013 | Singh | |
| 2015/0310722 A1* | 10/2015 | Sousa | H02J 7/025 |
| | | | 307/104 |
| 2019/0165611 A1* | 5/2019 | Miyazawa | H02M 1/32 |
| 2019/0238000 A1* | 8/2019 | Salvekar | H02J 7/025 |

* cited by examiner

Primary Examiner — Daniel Kessie
(74) Attorney, Agent, or Firm — Haynes and Boone, LLP (57) ABSTRACT

A current sensing circuit and a minimum operating frequency for a wireless power transmission system is presented. A method of measuring current through a wireless power transmit coil, includes receiving a signal from a switching circuit into a sampling circuit; filtering the sampled signal from the sampling circuit; biasing the filtered sampled signal, wherein the biasing occurs only when the sampling circuit is active; and amplifying the biased signal to provide a transmit coil current signal. A method of measuring current through a wireless power transmit coil, includes receiving a signal from a switching circuit into a sampling circuit; filtering the sampled signal from the sampling circuit; biasing the filtered sampled signal, wherein the biasing occurs only when the sampling circuit is active; and amplifying the biased signal to provide a transmit coil current signal.

7 Claims, 10 Drawing Sheets

WIRELESS POWER CHARGING

TECHNICAL FIELD

Embodiments of the present invention are related to wireless transmission of power and, in particular, to wireless power charging.

DISCUSSION OF RELATED ART

Mobile devices, for example smart phones, tablets, wearables and other devices are increasingly using wireless power charging systems. In general, wireless power transfer involves a transmitter driving a transmit coil and a receiver with a receiver coil placed proximate to the transmit coil. The receiver coil receives the wireless power generated by the transmit coil and uses that received power to drive a load, for example to provide power to a battery charger.

Typically, a wireless power system includes a transmitter coil that is driven to produce a time-varying magnetic field and a receiver coil, which can be part of a receiving device such as a cell phone, PDA, computer, or other device, that is positioned relative to the transmitter coil to receive the power transmitted in the time-varying magnetic field.

However, wireless power transmission provides for multiple challenges. One is monitoring the TX coil current, which can represent up to 82% of the transmitter power losses.

Therefore, there is a need to develop improved ways to operate wireless power transfer transmitters to provide for more efficient transfer of power.

SUMMARY

In accordance with embodiments of this disclosure, a current sensing circuit is presented. Further, a system for setting a minimum operating frequency for a wireless power transmission system is presented.

In some embodiments, a wireless power transmitter includes an inverter driven that includes series coupled MOSFET transistors driven by gate control signals, the inverter driving configured to drive a transmit coil coupled to a switching node between the series coupled MOSFET transistors; and a current sensing circuit coupled to receive a signal from the switching node. The current sensing circuit includes a sampling circuit coupled to receive the signal from the switching node when the sampling circuit is turned on, an amplifier coupled to receive a sampled signal from the sampling circuits, a filter coupled to the sampling circuits to filter the sampled signal; and a bias circuit coupled to bias the sampled signal at the amplifier, wherein the bias circuit is turned on when the sampling circuit is turned on.

A method of measuring current through a wireless power transmit coil, includes receiving a signal from a switching circuit into a sampling circuit; filtering the sampled signal from the sampling circuit; biasing the filtered sampled signal, wherein the biasing occurs only when the sampling circuit is active; and amplifying the biased signal to provide a transmit coil current signal.

A method of operating a wireless power transmitter includes operating a wireless power system that includes the wireless power transmitter providing power to a wireless power receiver at a first frequency; determining a zero-voltage switching (ZVS) deadtime at first frequency; lowering the first frequency until the ZVS deadtime is above a maximum ZVS deadtime; and setting a minimum operating frequency from the first frequency.

A wireless power transmitter includes an inverter that includes an upper transistor in series with a lower transistor and coupled between an input voltage and a ground, the upper transistor being driven according to a UG signal and the lower transistor being driven according to a LG signal; a TX coil coupled to a switching node where the upper transistor and the lower transistor are connected; a capacitor coupled between the switching node and ground; an analog front end coupled to receive the input voltage, ground, and a switching voltage at the switching node, the analog front end providing signals that indicate the level of the switching node; and a processor with a ZVS control process, the processor executing instructions to operate the wireless power transmitter to provide power to a wireless power receiver at a first frequency; determine a zero-voltage switching (ZVS) deadtime at the first frequency; lower the first frequency until the ZVS deadtime is above a maximum ZVS deadtime; and set a minimum operating frequency from the first frequency that is above the maximum ZVS deadtime.

These and other embodiments are discussed below with respect to the following figures.

These figures are further discussed below.

DETAILED DESCRIPTION

In the following description, specific details are set forth describing some embodiments of the present invention. It will be apparent, however, to one skilled in the art that some embodiments may be practiced without some or all of these specific details. The specific embodiments disclosed herein are meant to be illustrative but not limiting. One skilled in the art may realize other elements that, although not specifically described here, are within the scope and the spirit of this disclosure.

This description illustrates inventive aspects and embodiments should not be taken as limiting—the claims define the protected invention. Various changes may be made without departing from the spirit and scope of this description and the claims. In some instances, well-known structures and techniques have not been shown or described in detail in order not to obscure the invention.

Figure 1:
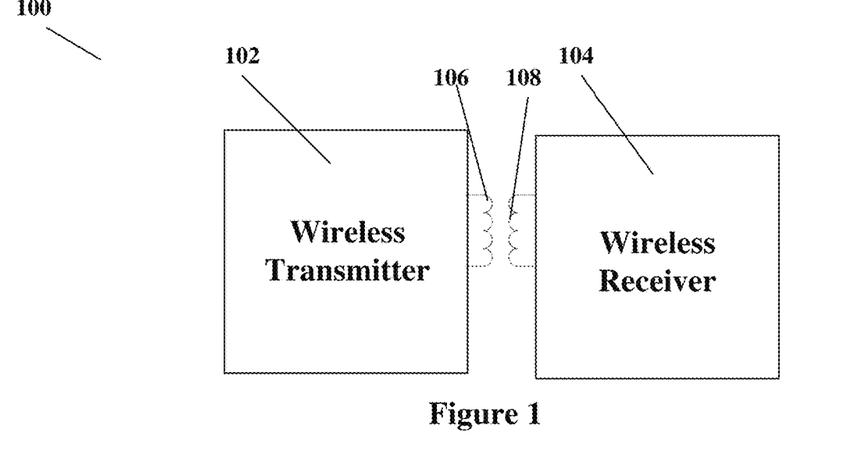
FIG. 1 illustrates a wireless power transmission system.

FIG. 1 illustrates an example wireless power transmission system 100 on which embodiments according to the present disclosure can be executed. As illustrated in FIG. 1, a wireless transmitter 102 is coupled to a coil 106 and a wireless receiver 104 is coupled to a coil 108. Coil 106 is driven by wireless transmitter 102 to produce a time varying magnetic field that in turn induces a current in coil 108. Coil 108 is coupled to wireless receiver 104, which can receive the power transmitted through the time varying magnetic field from wireless device 102.

Wireless receiver 104 can be included in any device with wireless power functions. Many phones, laptops, tablets, and other devices include a wireless power function. In many cases, these devices can both receive and transmit wireless power. In some examples, wireless transmitter 102 may be a stationary wireless power charger.

Some embodiments of the present invention allow for measurement of the coil current in a wireless power transmitter. The coil current in a wireless power transmitter should be monitored. In some cases, the current through the coil can represent up to 82% of the losses in the transmitter. Monitoring the current can help predict the power dissipation associated with the current, which is used to improve detection of foreign objects. Detection of foreign objects is a critical aspect of the responsibility of the wireless power transmitter according to the Qi wireless power protocol.

Other embodiments of the present invention allow for using dead time measurements in zero-voltage switching to set a minimum allowable frequency to avoid entering an inversion area. Using a dead-time measurement can allow operation with minimum allowable frequencies much close to a peak frequency for the particular system involving the power transmitter and power receiver system.

Figure 2:
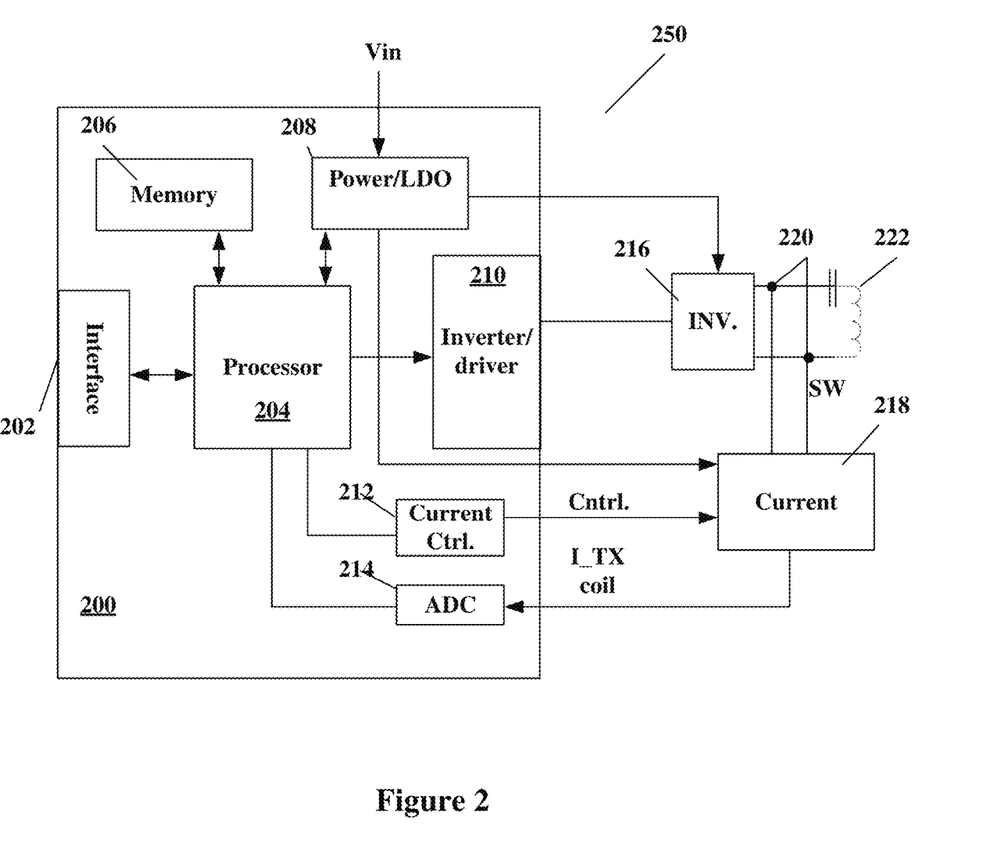
FIG. 2 illustrates a wireless power transmitter on which embodiments of the present disclosure can be implemented.

FIG. 2 illustrates an example of a wireless power transmitter (PTx) 200 on which embodiments of the present invention may be executed. PTx 200 may be formed on a single IC that is used to drive a transmit coil 222. PTx 200 receives power from an outside source into a power block 208. Power block 208 includes DC/DC converters and other power handling devices such as, for example, Buck converters, power filtering, low-dropout regulators (LDOs) and other devices to provide for the power needs of PTx 200. As is illustrated in FIG. 2A, PTx 200 includes an inverter/driver 210 coupled to drive an external inverter 216 that drives transmit coil 222 according to instructions from a processor 204.

Processor 204 can be any processing device that is capable of executing instructions to perform the functions described in this disclosure. In some embodiments, processor 204 is coupled through interface 202 to another device that provides instructions, in which case the functions described in this disclosure are performed by a combination of processor 202 and a device coupled through interface 202 with processor 204. Processor 204 can include any combination of microcomputers, microprocessors, state machines, or other circuitry that perform a part or all of the functions described in this disclosure.

Processor 204 can be coupled to a memory 206. Memory 206 can be any combination of volatile and non-volatile memory that stores data and instructions executed in processor 204. Memory 206 also includes any registers that are used in operation of processor 210.

FIG. 2 illustrates a wireless power transmitter 250 that illustrates current sensing aspects of embodiments according to the present invention. As is illustrated in FIG. 2, wireless power transmitter includes PTx 200, which in some embodiments can be formed on a single integrated circuit (IC), and external circuit as further described below.

As is illustrated in FIG. 2, PTx 200 includes a processor 204 that is coupled to power block 208, inverter/driver 210, and a current measurement control 212. PTx 200 is coupled to an inverter 216 where inverter/driver 210 drives transistors in invertor 216 that drives current through TX coil 222. Inverter 216 may include a full-bridge (formed with four transistors) or a half-bride inverter (formed with two series-coupled transistors) to drive current through a TX coil 222. Power to the inverter can be provided by power block 208, which can be controlled by processor 204 to control the output power of the time-varying magnetic field generated in coil 222. As is discussed further below, processor 204 can also control the wireless power output by controlling different characteristics of the MOSFET PWM waveform, such as duty cycle, phase or frequency at 5 which inverter 216 is driven, or other characteristics.

As is further illustrated in FIG. 2, the switching node or switching nodes 220, that are the nodes between inverter 216 and coil 222, are monitored by a current sense circuit 218. Current sense circuit 218 is turned on or off by current signal from control block 212 in PTx 200. As is illustrated, processor 204 can turn current sensing circuit 218 on or off with a control signal from current control block 212. Further, a signal indicative of the coil current, I_TX coil, can be received from current sensing circuit 218 into an analog-to-digital converter (ADC) 214 to be digitally read into processor 204 for further processing. The measured current is used in various algorithms executed on processor 204 to control the power output of the wireless power transmitter formed by PTx 200 in communication with TX coil 222. The measured current is further used to monitor power loss in the wireless transmitter. In some embodiments, instead of being received into ADC 214, an analog processing and comparator circuit may be used to monitor the transmission current levels.

In some embodiments, PTx 200 may include current sensing 218 incorporated on the same IC. However, as illustrated in this disclosure, current sensing 218 is an external circuit to PTx 200.

Monitoring the current in a low-cost manner is challenging. Current sensing circuit 218 may use a MOSFET drain-source on resistance (RDSON) of a low-side transistor of inverter 216 and a single op-amp to form a desirable low-cost method, especially in multi-coil systems that use a common point for sensing the coil current. Such a design can help save on component cost and design complexity. However, existing technologies have challenges balancing response time with noise filtering when using low-cost amplifier circuitry. Noise associated with the turn-on and turn-off of the sampling MOSFETs is a particularly challenging problem to address.

Figure 3:
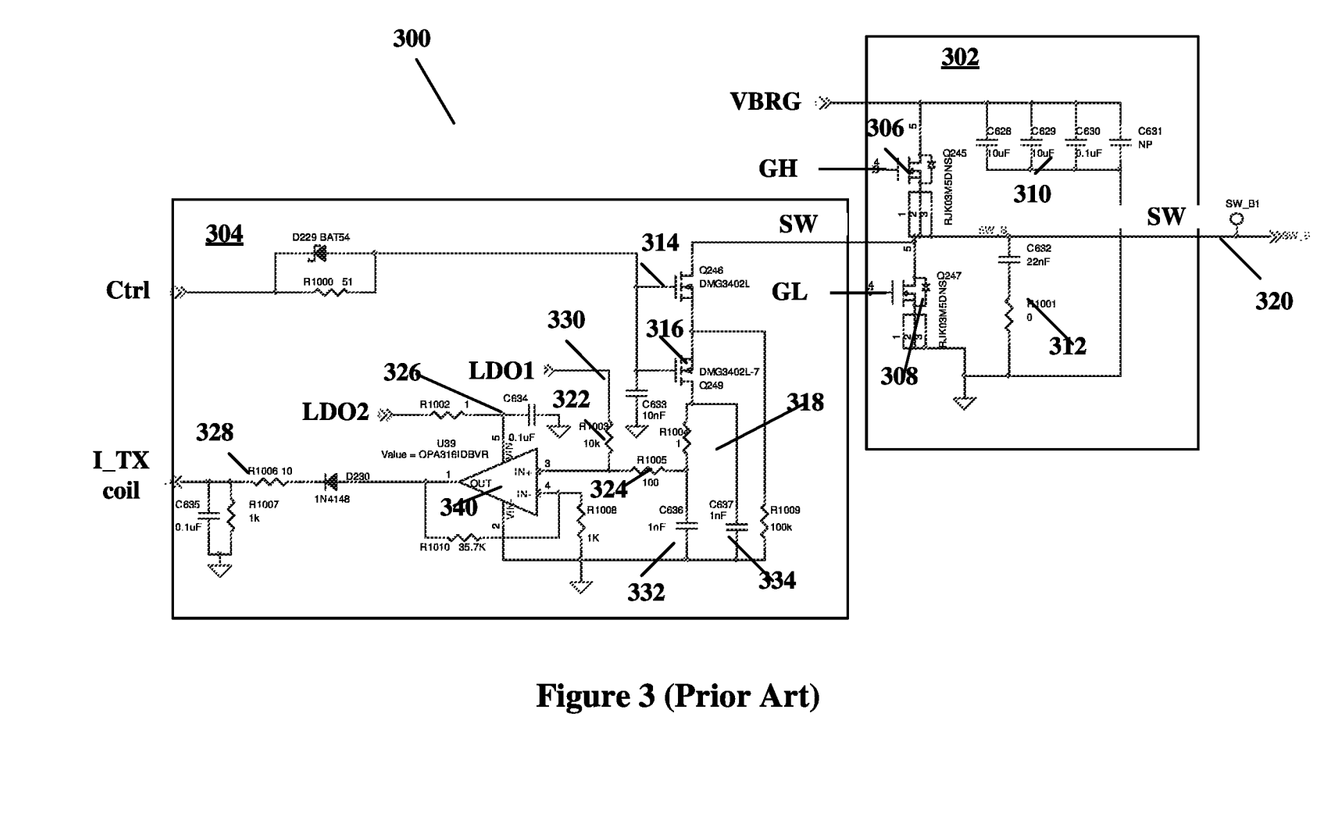
FIG. 3 illustrates a conventional current sensing circuit.

FIG. 3 illustrates a conventional system 300 for measuring the TX current as discussed above. FIG. 3 illustrates an inverter 302, which can be that illustrated as inverter 216 in FIG. 2. Inverter 302 includes series coupled MOSFET transistors 306 and 308. The gates of transistors 306 and 308 are driven, for example by a driver such as driver 210 as illustrated in FIG. 2, to drive current through a TX coil that is coupled to the switching node 320. As illustrated in FIG. 3, transistor 306 is driven by a GH signal from driver 210 and transistor 308 is driven by a GL signal from driver 210.

Switching node 320 is the embodiment switching node 220 as illustrated in FIG. 2, which in this example is the node between transistors 306 and 308. Inverter 302 may also include filter circuit 310 to filter the power supplied to a TX coil coupled to switching node 320. Circuit 312 is a zero-voltage switching (ZVS) circuit that slows down the slew rate of SW node 320 to help prevent electromotive interference (EMI). As is illustrated, a current sensing circuit 304 is coupled to SW node 320 to measure the voltage at SW 320 that results from the RDSON of transistor 308 and the current I_TX through a coil coupled to SW 320.

FIG. 3 further illustrates a current sensing circuit 304 that is coupled to switching node 320. As is illustrated in FIG. 3, current sensing circuit 304 includes series-coupled sampling transistors 314 and 316 coupled between switching node 320 and an amplifier 340. Transistors 314 and 316 are sampling MOSFETs with gates controlled by a control signal, for example the control signal as generated by current control 212 of PTx 200. As is illustrated in FIG. 3, amplifier 340 is powered at node 326 by a power output LDO 2 from, for example, power block 208 from PTX IC 200. A filtering circuit 318 may further be coupled to the coupling between transistors 314 and 316 and amplifier 340. The output of amplifier 340 is coupled to the signal I_TX coil signal input to PTx 200, as illustrated in FIG. 2, through an output filter 328. Output filter 328 can be a peak detect filter.

Although FIGS. 2 and 3 illustrate current sensing circuits 218 and 304, respectively, as external to the IC formed by PTx 200. As is discussed above, current sensing circuits 218 and 304 may, in some cases, be integrated into a single IC with PTx 200. Further, bias circuit 330 may be calibrated for improvement gain by adjusting the voltage LDO1 at no load operation.

FIG. 3 illustrates a current sensing circuit 304 using a synchronous MOSFET sensing circuit. In some embodiments, amplifier 340 can be a low-cost amplifier. The circuit design then has an input offset 330 to keep the sensed voltage at amplifier 340 within the common mode range of the low-cost amplifier 320. As is illustrated in FIG. 3, offset 330 is formed with a biased resistive divider formed by series coupled resistors 322 and 324 where the input to amplifier 340 is coupled to the node between resistors 322 and 324. The bias comes from voltage LDO1, which again can be received from power block 208 in PTx IC 200. In some embodiments, LDO1 can be a 1.8V bias voltage.

However, the capacitors, specifically capacitors 332 and 334, of filtering circuit 318 in this arrangement must be kept small to allow the system to stabilize quickly to the sensed voltage level. The specific issue is that the bias voltage disturbs the voltage stored on the filter capacitors 332 and 334 by increasing their offset when the sampling MOSFETs 314 and 316 are off, which can negatively impact the operation of current sensor 304.

Figure 4:
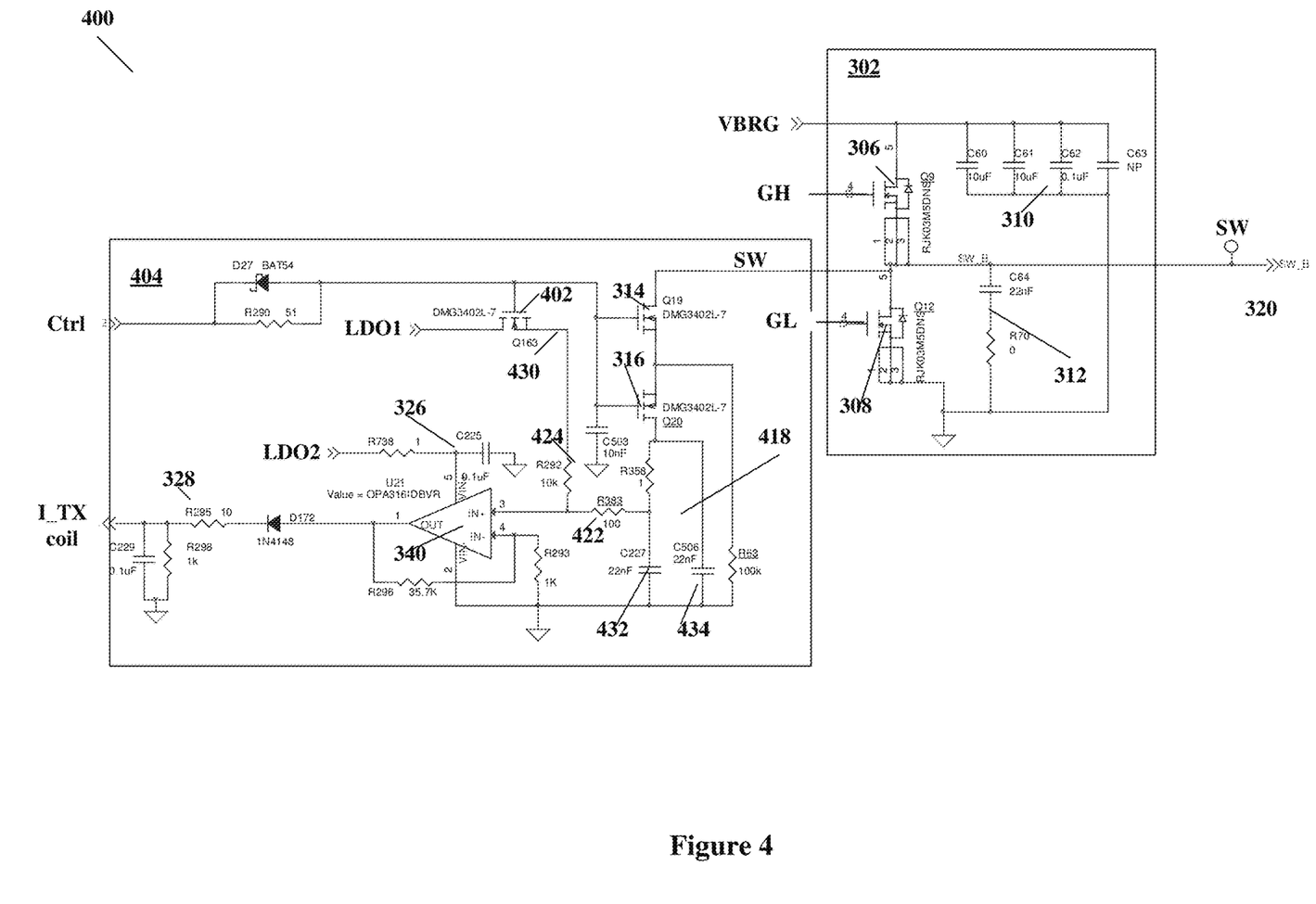
FIG. 4 illustrates a current sensing circuit according to some embodiments according to the present disclosure.

FIG. 4 illustrates a system 400 with a current sensing circuit 404 according to embodiments of the present disclosure. In comparison with system 300 and current sensing circuit 304 illustrated with FIG. 3, bias circuit 330 is replaced by a bias circuit 430. In bias circuit 430, a transistor 402, with gate coupled to the control signal, is turned on with transistors 314 and 316. Transistor 402, which is a MOSFET, is coupled to a voltage divider formed by series-coupled resistors 422 and 424. The node between resistors 422 and 424 are input to amplifier 340. Further, filter 318 is replaced with filter 418, which includes capacitors 432 and 434.

As current sensing circuit 404 a synchronous sampling circuit, the bias driven by voltage LDO1 (e.g., 1.8 V) can be controlled by the same gate signal that controls the sampling of the input signal from switching node 320 by MOSFET transistors 314 and 316. Placing a MOSFET transistor 402 in series with the bias resistors 422 and 424 achieves the goal of not negatively affecting the capacitors 332 and 334 of filter 318 during the times when MOSFET transistors 314 and 316 are off. In some embodiments, bias circuit 430 can be calibrated, for example by adjusting the voltage on LDO1. Such calibration can be accomplished, for example, with no load.

Further, the filter capacitors 432 and 434 can be much larger than filters 332 and 334 of filter 318 of conventional current sensing circuit 304 since they are no longer biased when sampling is not occurring. The end result is a cleaner output signal I_TX coil on the board and improved measurements of the current signal.

In particular, in current sensing circuit 404 current only flows through the bias resistors 422 and 424 when current sensing circuit 404 is active. As discussed above, the current flows when MOSFET transistor 402 is turned on by the same gate control signal that turns on the sampling transistors 314 and 316.

Furthermore, bias on amplifier 340 is only applied when current sensing circuit 404 is monitoring the voltage at SW node 320, which is monitoring the voltage at SW node 320. This voltage, for example, can be given by I_coil*RDSON_308), where RDSON_308 is the drain-source ON resistance of MOSFET transistor 308.

This novel solution elegantly allows for much higher quality measurements by allow for the use of larger filtering capacitors while simultaneously reducing the output power by allowing current through the bias circuit only when the current control circuit is active. Consequently, the current sensing circuit 404 allows for a wireless power system 400 that monitors coil current with external circuitry using RDSON (the RDSON of transistor 308). Current sensing circuit includes an amplifier 340 with inputs that use filters for noise reduction and are biased to align with the specification of amplifier 340. Current sensing circuit 404 samples the voltage at switching node 320 only when the control signal is activated. The biasing circuit further includes a MOSFET transistor 402 in series with the voltage divider formed by resisters 422 and 432. Transistor 402 is also activated by the control signal, which prevents biasing when current sensing circuit 404 is inactive.

The current on the coil coupled to SW node 320 can be further improved when correlated other variables, for example the peak voltage on SW node 320. This results from an integration of the coil current. Correlating the integrated coil current with the peak coil current helps processor 200 to calculate the IRMS, which is applied to estimating the AC losses in wireless power transmitter 250.

Figure 5:
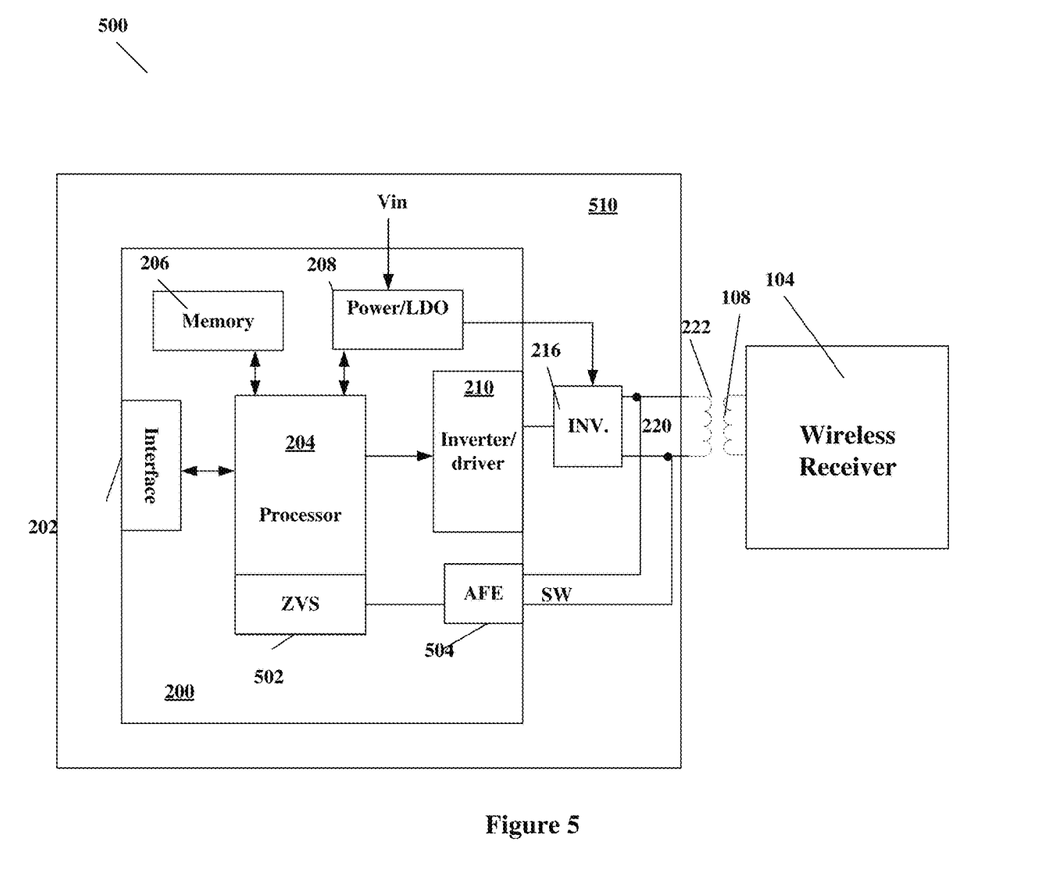
FIG. 5 illustrates another wireless power system with further aspects of the wireless power transmitter according to this disclosure.

One area, among many, where the current through the coil is used for monitoring and controlling wireless power transfer, is with monitoring and controlling switching in the inverter with zero-voltage switching. FIG. 5 illustrates a wireless power system 500 that includes a wireless power transmitter 510. Wireless power transmitter 510 transmits wireless power through TX coil 222 with PTx 200 driving inverter 216. As discussed above, the transmitted wireless power from transmitter 510 can be received into a wireless receiver 104 through receive coil 108. As is known, driver 210 drives transistors in inverter 216 to provide a time varying magnetic field at TX coil 222. Driver 210 drives inverter 216 at a particular frequency, which may be adjusted to maximize efficient power transmission to wireless receiver 104. In FIG. 5, current sensing circuit 218 has been omitted, but may be present to monitor the current through Tx coil 222 by measuring the voltage at switching node 220 as discussed above. However, some embodiments may use other current sensing circuits, including ones incorporated within PTx 200, besides the current sensing circuit 404 as described above.

As is illustrated in FIG. 5, an analog-front-end (AFE) circuit 504 is coupled to receive the voltage from SW node 220 and provides a signal to a zero-voltage-switching (ZVS) controller 502. ZVS controller 502 is executed by processor 204 and monitors the voltage at switching node 220. ZVS controller 502 then controls switching in driver 210 so that switching of transistors in inverter 216 occurs when the voltage across the switched transistor is zero. This procedure greatly reduces electromotive interference (EMF) that is caused by switching of transistors in inverter 216. ZVS controller 502 can also provide information regarding the time between when the transistors in inverter 216 should be switched to allow for a particular frequency of operation and the time that the transistors are actually switched to provide for ZVS operation is the dead time, which is discussed further below.

In accordance with, for example, the QI wireless power protocol, variable frequency control can be used as one method for PTx 200 to regulate the power transfer between the wireless power transmitter and the wireless power receiver. When operating in a normal operating region, lowering the operating frequency increases power and increasing the operating frequency decreases power delivery.

Figure 6:
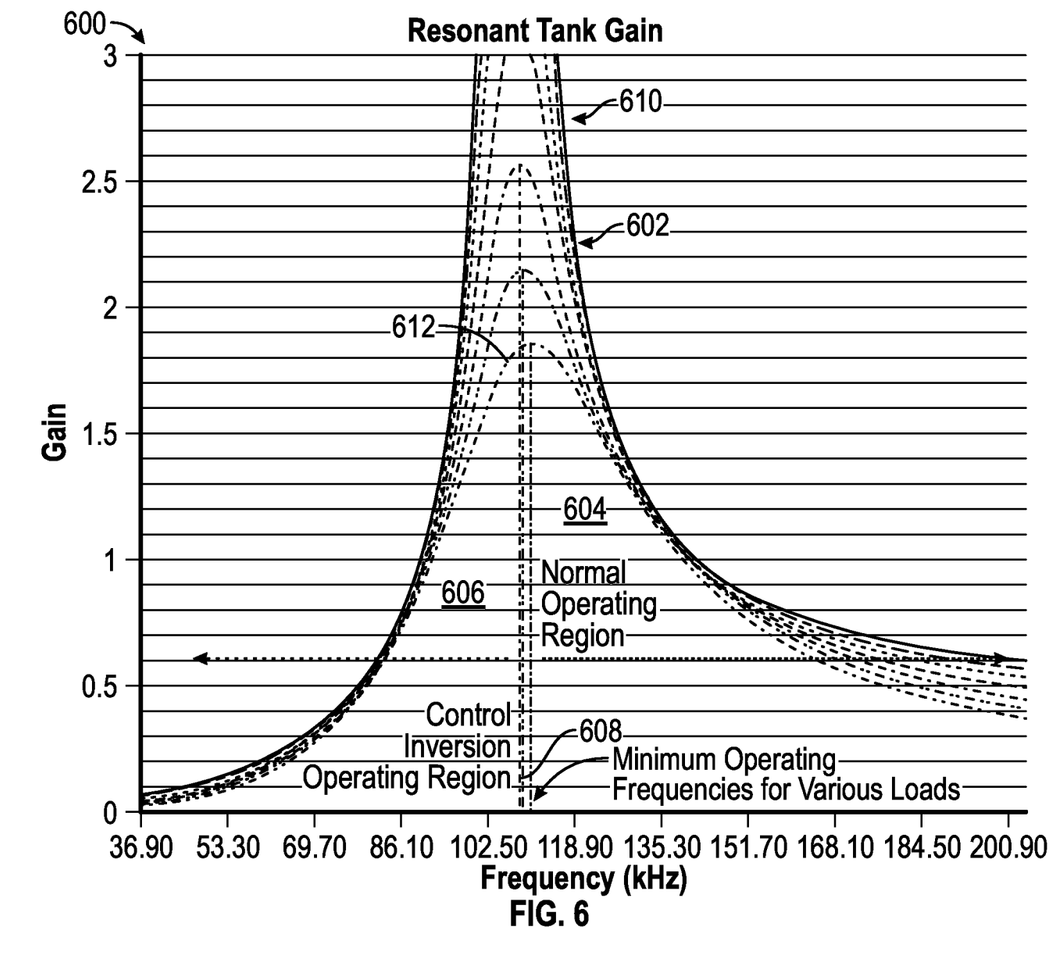
FIG. 6 illustrate resonant tank gain curves as a function of frequency for a system as illustrated in FIG. 5.

FIG. 6 illustrates this feature with a graph of resonant tank circuit gain versus frequency for a wireless power system such as system 500 as illustrated in FIG. 5. As is illustrated, tank circuit gain curves 602 illustrate the tank circuit resonant gain versus driving frequency for the wireless power transmission between wireless power transmitter 510 and receiver 104 with receiver 104 servicing various loads. As illustrated in FIG. 6, curves 602 illustrate highest and sharpest curves with lighter loads and lower, wider curves for higher loads. The high curve 610 illustrates a 0% load on receiver 104 while the lowest curve 612 illustrates a 100% load on receiver 104. The curves between curves 610 and 612 illustrates various loads on receiver 104. As illustrated, from top curve 610 to lowest curve 612, the loads illustrated are at 25% load, 40% load, 55% load, 70% load, and 85% load.

FIG. 6 also illustrates the peak gain 608 for each of the curves 602. As is illustrated, as the load is increased, the peak frequency for each curve shifts from lower frequencies to higher frequencies. As is further illustrated in FIG. 6, wireless power systems operating in an operating region 604 that is higher than the peak gain. As discussed above, when operating in normal operating region 604 when the frequency increases the power (represented by the gain curve 602) decreases while when the frequency decreases the power increases.

However, if the system's operating frequency drops below the natural frequency (represented by the peaks 608 of the gain curves 602) of the system, the control relationship inverts. In inversion region 606, where the operating frequency is below the peaks 608 of curves 602, further lowering of the operating frequency decreases power delivered to wireless power receiver 104. The transition point between operating region 604 and inversion region 606, marked by the peak 608 of the curve of curves 602, is difficult to detect. Further, the region of control inversion also displays hard switching where the electromotive interference (EMI) characteristics of the system is increased. Consequently, in most conventional systems the wireless power system is operated to avoid this situation.

Consequently, conventional systems have some method of setting a lower bound to the operating frequency which is above the natural frequency of the system to prevent control inversion. In FIG. 6, the minimum operating frequency is represented by the peak frequency 608. In many systems, the minimum operating frequency is set higher than the peak frequency 608 of the particular operating curve 602.

Figure 7:
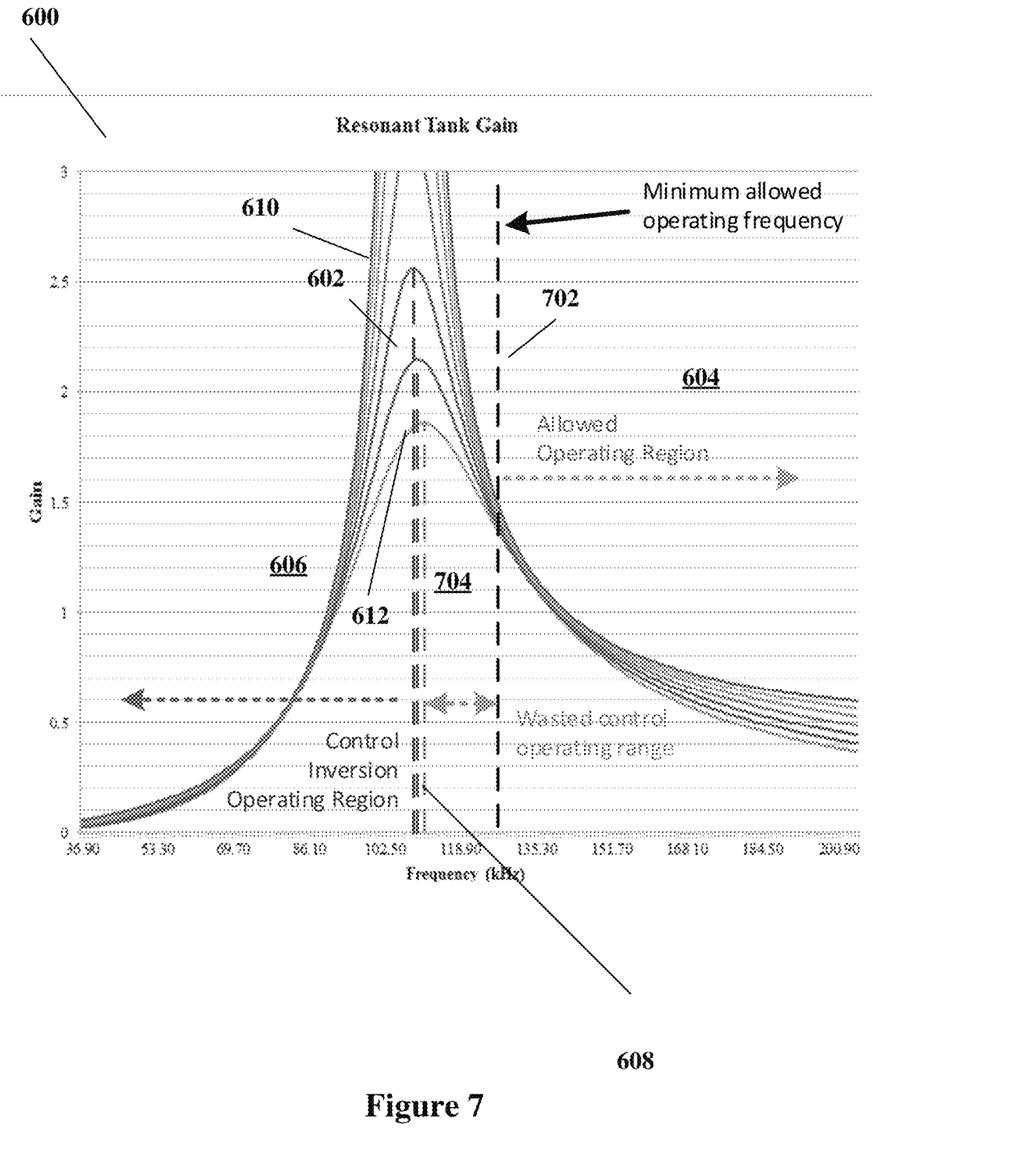
FIG. 7 illustrates functionality of a conventional wireless power system.

FIG. 7 illustrates the conventional setting of a minimum operating frequency 702 that is well above the peak frequency 608. FIG. 7 illustrates again the gain curves 602 as illustrated in FIG. 6. As illustrated in FIG. 7, conventional operation sets the minimum operating frequency 702 to shift the allowed operating region 604 to frequencies higher than the minimum allowed operating frequency 702. This, however, leaves a gap 704 between the minimum allowed operating frequency 702 and the peak frequency 608 in which the system is not allowed to operate.

In the past a given wireless power transmitter design is characterized on a bench against known wireless power receiver designs operating over a variety of conditions to determine the maximum system resonant frequency 702. This maximum system resonant frequency 702, which includes some safety margin, is loaded into the power transmitter system, which then monitors the system operating frequency such that the frequency is never allowed to go below the set minimum operating frequency 102 for that wireless receiver. The weakness of this technique is that all designs are limited by the worst product the wireless power transmitter was characterized against. New products could be outside this limit and the wireless power transmitter has no way to compensate—resulting in control inversion, EMI and poor user experiences. Further, potentially high efficiency areas of operation in gap 704 are inaccessible to the wireless power transmission system.

Operating close to the resonate frequency is desirable to maximize efficiency and/or delivered power. Achieving this without control inversion can be very challenging as the minimum frequency can vary with load and with alignment between the wireless power transmitter and the wireless power receiver in the wireless power system.

With reference again to FIG. 5, as discussed above ZVS control 502 in processor 204 is operated to monitor dead time and control the operating frequency to achieve zero-voltage switching (ZVS). As is illustrated in FIG. 5, PTx 200 includes auto-tuning ZVS dead time control loop 502 which controls the switching of transistors in inverter 216 so that switching is accomplished when the voltage at node 220 is zero-volts. ZVS control loop 502 may be at least partially operated on processor 204, as is illustrated in FIG. 5. As is illustrated in FIG. 5, ZVS control loop 502 operating in processor 204 receives signals from an analog-front-end circuit 504 that receives signals from the switching node 220 from inverter 216. ZVS control loop 502 determines the zero-voltage switching dead time from the data received from SW 220, as is further discussed below. Other techniques including monitoring body diode conduction time and hard switching characteristic monitoring, are also possibly included in PTx 200.

As illustrated, PTx 200 lowers the operating frequency while monitoring the amount of dead time required to achieve a Zero Voltage Switching (ZVS) situation in ZVS control circuit 502. The lowest frequency where the ZVS dead time is below a threshold maximum allowable deadtime value can be set as the minimum allowable operating frequency. This situation is illustrated, for example, in FIG. 8.

Figure 8:
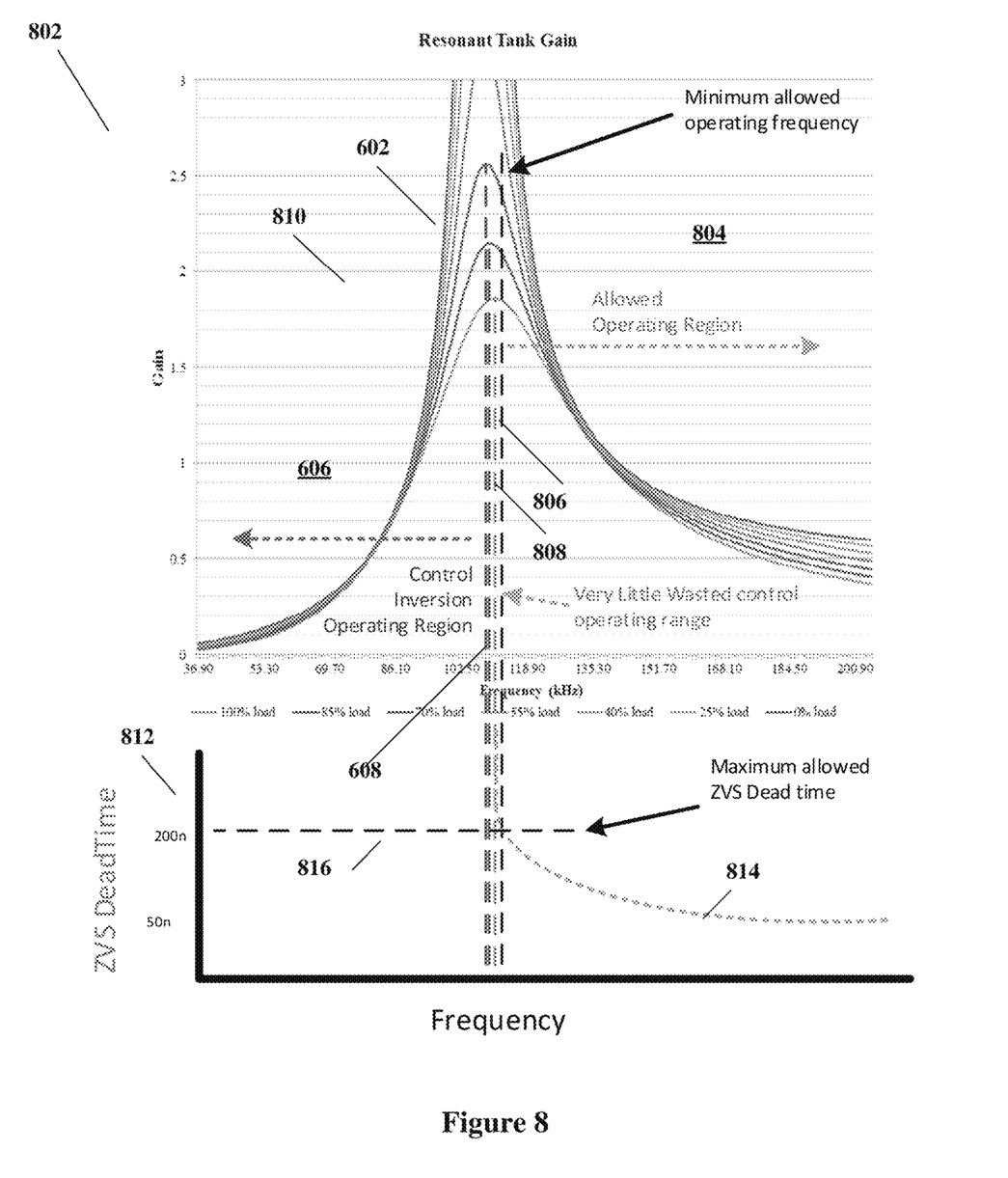
FIG. 8 illustrates functionality of a wireless power transmitter according to some embodiments of the present disclosure.

FIG. 8 illustrates a graph 810, which again illustrates the gain curves illustrated in FIGS. 6 and 7. Consequently, FIG. 8 also illustrates the resonant tank gain versus frequency curves 602 as discussed above. As is illustrated, the peak frequency 608 for each of the resonant curves in curves 602 is illustrated. Also illustrated with graph 810 is graph 812, which illustrates the deadtime 814 as a function of frequency as the frequency is decreased in the allowed operating region 804. When the deadtime exceeds a specifically programed maximum time 816, PTx 200 stops reducing the operating frequency of the system. Reaching the maximum dead time 816 indicates that PTx 200 has reduced the frequency below a point where the system may transition into the Control Inversion Operating region 606. Consequently, PTx 200 increases the frequency so that the dead time 814 is below the maximum dead time 816, where the minimum allowable frequency 806 can be set. This situation allows the minimum allowable frequency 806 to be set according to the actual system with real-time characterization and results in a very small unusable gap 808. The small gap 808 provides for very little wasted frequency range in the control of the wireless power system. The maximum deadtime 816 can be set around the value above which the wireless power transmitter transitions to control inversion region 606.

Figure 9A:
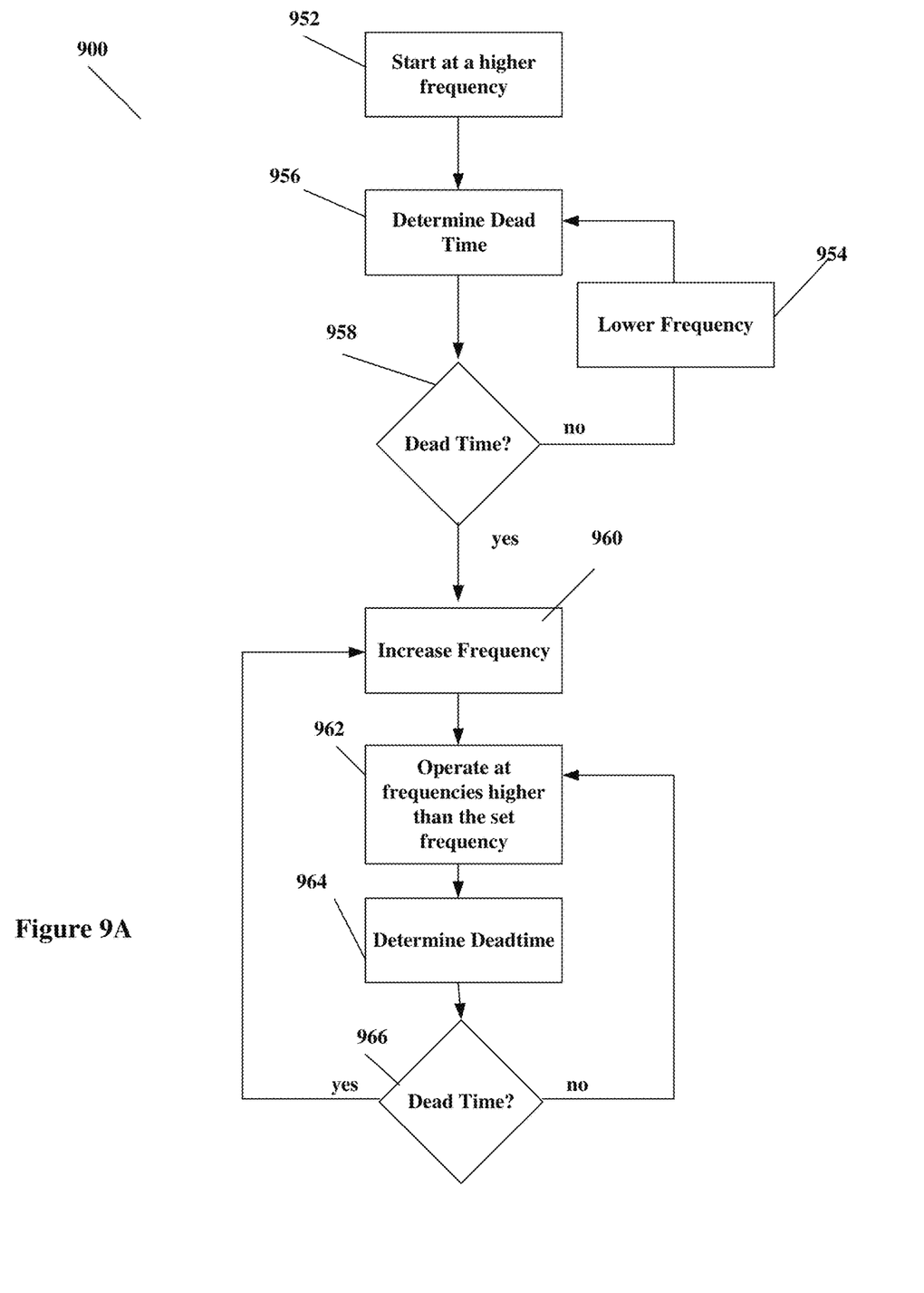
FIG. 9A illustrates details of the wireless power transmitter illustrated in FIG. 5 illustrating aspects according to the present disclosure.

FIG. 9A illustrates a process 900 that can be executed by processor 204 with ZVS controller 502 according to some embodiments of the present disclosure. In some embodiments, process 900 may be operated to characterize wireless power transmission system 500 when receiver 104 is brought in proximity to wireless power transmitter 510. In the example process 900 illustrated in FIG. 9A first sets the minimum allowable frequency and then operates the wireless power transmitter 510 while continuing to monitor the deadtime.

As illustrated in FIG. 9A, process 900 starts in step 952 at an operating frequency that is high enough to be within the operating region 804 as illustrated in FIG. 8. In step 956, the deadtime is determined. In step 958, processor 204 determines whether the deadtime has exceeded a maximum dead-time value, which has been preprogrammed into PTx 200. If not, then processor 204 proceeds to step 954 where the operating frequency is lowered. Processor 204 then returns to step 956 to determine the deadtime with the new operating frequency.

If the maximum deadtime has been reached in step 958, then in step 960 processor 204 may increase the frequency slightly to allow for a safety factor to set the minimum allowable frequency 806 for the wireless power transmission system 500. In step 962, PTx 200 then operates wireless power transmitter with the minimum allowable frequency 806 as set in step 960, adjusting the operating frequency within the allowed operating range as needed. Periodically, PTx 200 may proceed to step 964 where the deadtime is determined using the current operating frequency. In step 966, if it is determined that the deadtime is below the maximum deadtime, then PTx 200 returns to step 962 for continued operation. If the deadtime is below the maximum deadtime, however, then PTx 200 may return to step 960 to reset the minimum allowable frequency 806 to a higher value.

Consequently, as illustrated in FIGS. 8 and 9A, PTx 200 lowers its operating frequency and monitors the amount of dead time required to achieve Zero Voltage Switching. As illustrated, PTx 200 includes auto-tuning ZVS deadtime control loop 502, although other systems may include other techniques including monitoring body diode conduction time and hard switching characteristic monitoring, are also possible.

When the frequency is lowered to a point where the deadtime exceeds a specifically programed maximum time, PTx 200 stops reducing the operating frequency of the system. Reaching the deadtime limit in step 958 indicates that PTx 200 has reduced its frequency too far and is at risk of entering a region that does not support ZFS (i.e. hard switching may occur), indicating operation in the Control Inversion Operating region 606 instead of the allowed operating region 804. Consequently, in step 960 the system frequency may be increased to set the minimum allowed operating frequency 806 as illustrated in FIG. 8.

In some embodiments, in steps 962, 964, and 966 PTx 200 continually monitors the dead time. If the maximum dead-time is reached, PTx 200 can adjust the minimum operating frequency 806 higher so that system 500 does not transition to control inversion region 606.

Figure 9B:
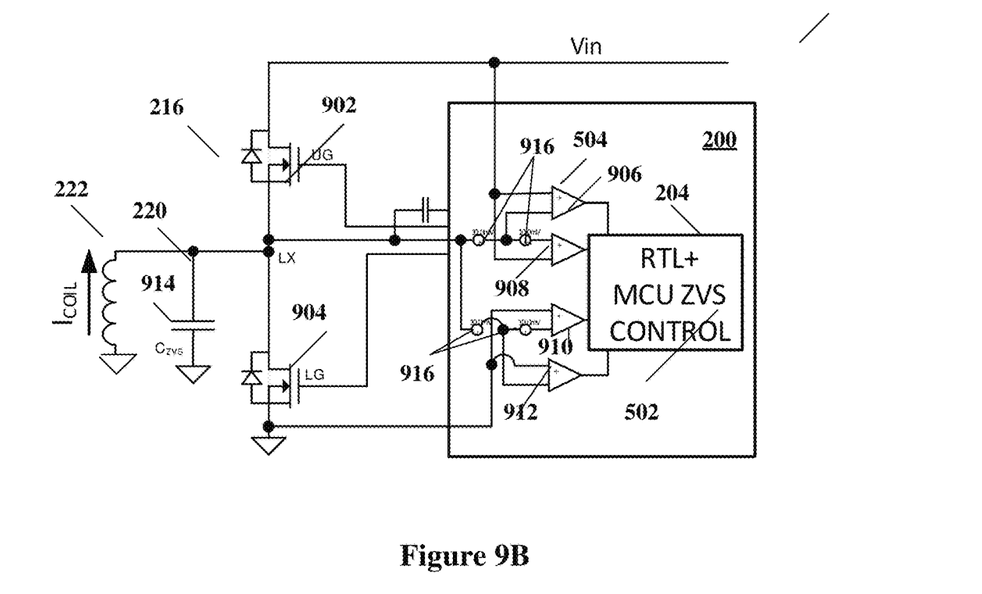
FIG. 9B illustrates a process operating on the wireless transmitter illustrated in FIGS. 5A and 5B according to some embodiments of the present disclosure.
Figure 10:
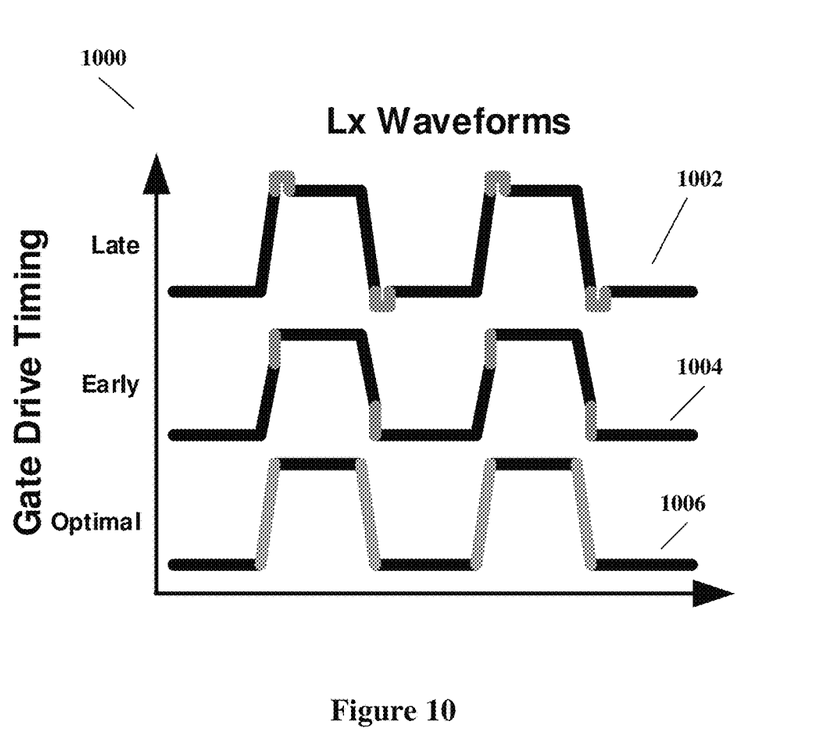
FIG. 10 further illustrates aspects of the wireless power transmitter illustrated in FIGS. 5 and 9A according to the present disclosure.
Figure 11:
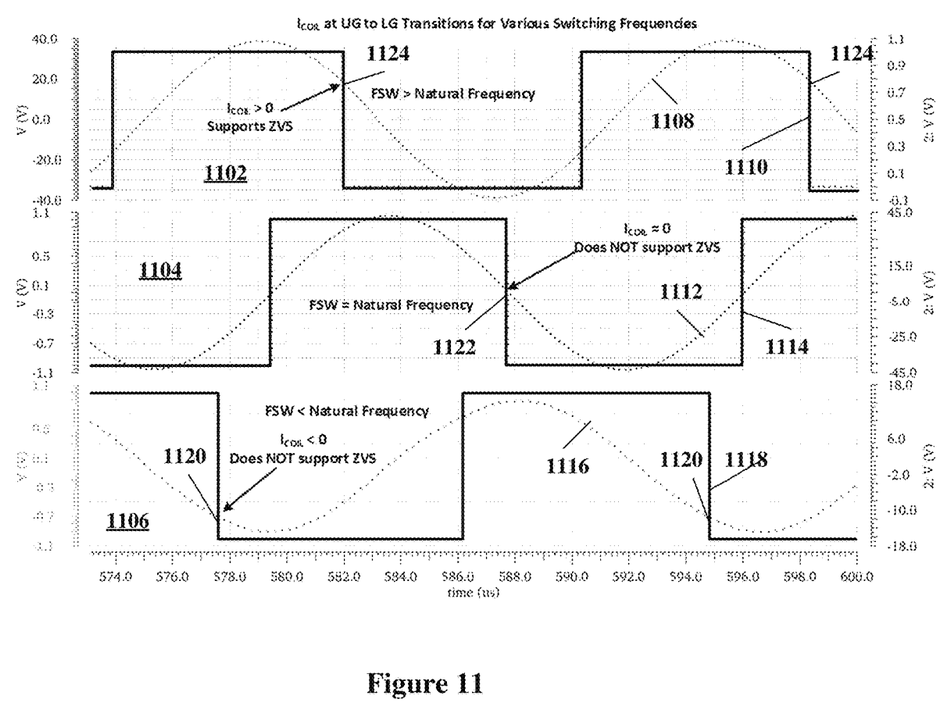
FIG. 11 illustrates further details of operation of a wireless power transmitter illustrated in FIGS. 5 and 9A.

FIGS. 9B, 10, and 11 illustrate further zero-voltage switching (ZVS) and determination of the dead time. FIG. 9B illustrates a further example of wireless power transmitter 510 as has been illustrated in FIG. 5, and on which process 900 may be executed. As illustrated in FIG. 9B, inverter 216 is illustrated has a half-bridge converter with series-coupled transistors 902 and 904 coupled between an input voltage Vin and ground. In this example, inverter 216 is powered by the same voltage that powers PTx 200. Transistor 902 is the "upper" transistor because it is coupled to the input voltage and is driven by an upper gate (UG) signal from PTx 200. Similarly, transistor 904 is the "lower" transistor because it is coupled to ground and is driven by a lower gate (LG) signal from PTx 200.

Switching (SW) node 220 is the node between transistors 902 and 904. TX coil 222 is coupled between switching node and ground. In this arrangement, a capacitor 914 is coupled in parallel with TX coil 222, between SW node 220 and ground.

Processor 204 can be a microcontroller unit that may operate use register transfer level (RTL) processing with the ZVS control process 502. AFE 504 provide an indication of the SW voltage at SW node 220 with respect to ground and the input voltage. AFE 504 may, in one example embodiment, include comparators 906, 908, 910, and 912, although any number of comparators may be used. Comparators 906 and 908 compare the voltage at SW node 220 with in the input voltage and comparators 910 and 912 compare the voltage at SW node 220 with ground. As is illustrated, comparator 906 and 908 provide an indication as to whether or not the SW node voltage is within a window defined by voltage sources 916 of the input voltage. Similarly, comparators 910 and 912 provide an indication to processor 204 as to whether the SW node voltage is within a window defined by voltage sources 916.

As discussed above, Zero Voltage Switching (ZVS) occurs when the voltage across a switch is equal to zero volts when the switch is turned on. As discussed above, the voltage at SW 220 can be given by I*RDSON, where I is the current through coil 222 and RDSON is the on-resistance of transistor 914. As is illustrated in FIG. 902, inverter 216 can operate with transistor 902 on and transistor 904 off, transistor 902 off and transistor 904 on, or both transistor 902 and transistor 904 off. Inverter 216 will not operate with both transistor 902 and 904 on (which would short Vin to ground).

At a transition from transistor 902 being on to transistor 904 being on, after transistor 902 is turned off the LG signal to turn transistor 904 on is delayed, creating dead time where no Switch is on. During the delay time, the coil current through TX coil 222 allows discharge of capacitor 914 to naturally change the voltage at SW node 220 from VIN to Ground. This process is further discussed in U.S. patent Ser. No. 10/211,720 entitled "Wireless Power Transmitter Having Low Noise and High Efficiency, and Related Methods," which is herein incorporated by reference in its entirety. An analogous event occurs at the transition between transistor 904 being on and transistor 902 being on.

ZVS control 502 naturally adjusts the dead time between assertion of the UG signal and assertion of the LG signals. If the current in the coil is too small to achieve ZVS, dead time is increased. If current is too large and the ZVS point is missed the dead time is decreased. FIG. 10 illustrates a waveform at SW node 220. A late switching (the deadtime being too large) is illustrated in waveform 1002, where the voltages overshoot. An early switching (the deadtime being too small) is illustrated in waveform 1004, where the waveform does not reach the target voltages. Waveform 1006 illustrates optimal switching where wireless power transmitter 510 naturally reaches the target voltages.

As the operating frequency of wireless transmitter 510 approaches the natural frequency of wireless power system 500 defined at peaks 608, the current available for slewing SW node 220 approaches zero requiring, longer and longer dead times to prevent a hard switching situation. This is further illustrated in FIG. 11. FIG. 11 illustrate an operation 1102 where the operating frequency of the system is greater than the peak 608, which defines the natural frequency, for system 500. Operation 1104 illustrates a situation where the operating frequency is the natural frequency of the system. Operation 1106 illustrates where the operating frequency is less than the natural frequency of the system.

Operation 1102 illustrates the coil current Icoil 1108 with the UG signal 1110. Operation 1104 illustrates the coil current Icoil 1112 with the UG signal 1114. Operation 1106 illustrates the coil current Icoil 1116 with the UG signal 1118.

As illustrated in operation 1106, when the operating frequency is less than or equal to the system's natural frequency there is no realistic amount of dead time that will achieve ZVS switching. In this region, when UG signal 1118 is switching at time 1120 (i.e. turning from on to off), the current illustrated in Icoil current 1116 is negative and therefore is moving in the opposite direction needed for ZVS. Consequently, hard switching is forced to occur, making ZVS impossible in the assigned switching window. This region is also the control inversion area 606 as illustrated in FIG. 8.

In operation 1105, the system is operating at the natural frequency. In that case, switching at time 1122 occurs when the coil current Icoil illustrated by curve 1112 is zero, there is insufficient coil current to achieve ZVS.

However, in operation 1102, there is a positive coil current at switching time 1124 there is a positive Icoil current. This results in operation which can achieve ZVS with a finite delay time.

The Auto-ZVS 502 with AFE 504 detects the lack of ZVS operation and attempts to achieve ZVS by increasing the UG-LG Dead Time. Auto-ZVS will increased dead time until it saturates its control loop. When the system detects that Dead Time has reached its (maximum) value (saturated) the system knows the coil operating frequency is below the natural frequency and it must be increased to achieve ZVS.

Well-designed Auto-ZVS systems have a saturation limit to detect this (or similar) types of events. In practical application additional operational information is used to augment this decision, for example operating mode of the inverters and load current of the system—in order to manage corner operating conditions.

As discussed above, this detection method allows processor 204 to dynamically adjust the operating frequency to be as close as possible to the natural frequency (to optimize efficiency and/or power delivery) and still maintain ZVS operation (for low EMI). This method is discussed above with respect to FIG. 9.

Consequently, in accordance with some embodiments, a wireless power transmitter changes the operating frequency with a minimum operating frequency that is close to the natural frequency. The wireless power transmitter can change the operation frequency so long as it remains above the minimum operating frequency in order to adjust the power output of the wireless power transmitter. The minimum operating frequency is set higher than the natural frequency of the system so that the operating frequency does not drop below the natural frequency. In such a system, the dead time required to achieve ZVS is monitored and the operating frequency is adjusted such that the dead time is below a As discussed above, wireless power transmitter 510 determines the minimum operating frequency by monitoring the dead time. Further, wireless power transmitter 510 can determine when the operating frequency is below the natural frequency because, in that region, ZVS cannot be achieved with any reasonable dead time. Further, wireless power transmitter 510 stops lowering or raises its minimum operating frequency to maintain operation above, yet close to, the natural frequency of the system based upon the dead time information described above.

Embodiments of the invention described herein are not intended to be limiting of the invention. One skilled in the art will recognize that numerous variations and modifications within the scope of the present invention are possible. Consequently, the present invention is set forth in the following claims.

What is claimed is:
1. A wireless power transmitter, comprising:
   an inverter that includes series coupled MOSFET transistors coupled between a voltage and a ground, gates of the series coupled MOSFET transistors being driven by gate control signals, the inverter configured to drive current through a transmit coil, the transmit coil being coupled to a switching node that is driven by the series coupled MOSFET transistors of the inverter;
   a current sensing circuit coupled to receive a signal from the switching node, the current sensing circuit including
   a sampling circuit coupled to receive the signal from the switching node when the sampling circuit is turned on according to a control signal coupled to control the sampling circuit,
   an amplifier coupled to receive a sampled signal from the sampling circuit when the sampling circuit is turned on,
   a filter coupled to the sampling circuit to filter the sampled signal; and
   a bias circuit coupled to bias the sampled signal at the amplifier, the bias circuit being coupled to receive the control signal, and wherein the bias circuit is turned on when the sampling circuit is turned on and is turned off when the sampling circuit is turned off according to the control signal, wherein the filter is not affected by the bias circuit when the bias circuit and the sampling circuit are turned off, and wherein the bias circuit includes a transistor coupled between a bias voltage and a voltage divider, the transistor being turned on when the sampling circuit is turned on.

2. The wireless power transmitter of claim 1, wherein the signal from the switching node is a voltage dependent on a current through the transmit coil and the drain-source ON resistance of a MOSFET transistor in the inverter.

3. The wireless power transmitter of claim 1, wherein the filter includes capacitors that are not affected by the bias circuit when the sampling circuit is turned off.

4. The wireless power transmitter of claim 1, further including a peak detect filter that receives an amplified signal from the amplifier and provides a TX current signal.

5. A method of measuring current through a wireless power transmit coil, comprising:
   turning a sampling circuit on in response to a control signal to receive a signal from an inverter, the inverter being coupled between a voltage and a ground and configured to drive current through a transmission coil in accordance with inverter control signals;
   filtering the sampled signal from the sampling circuit in a filter circuit;
   turning a biasing circuit on according to the control signal when the sampling circuit is turned on to bias the filtered sampled signal, wherein the biasing occurs only when the sampling circuit is turned on; and
   amplifying the biased signal to provide a transmit coil current signal,
   wherein the filter circuit is not affected by the bias circuit when the bias circuit and the sampling circuit are turned off, and
   wherein biasing the filtered sampled signal includes providing a bias voltage through a voltage divider to provide the biased signal through a transistor that is on when the sampling circuit is on.

6. The method of claim 5, wherein the transmit coil current signal is received into a power transmitter integrated circuit.

7. The method of claim 5, further including determining presence of a foreign object from the transmit coil current signal.

* * * * *

UNITED STATES PATENT AND TRADEMARK OFFICE
CERTIFICATE OF CORRECTION

PATENT NO. : 11,374,440 B2
APPLICATION NO. : 16/945601
DATED : June 28, 2022
INVENTOR(S) : Gustavo Mehas It is certified that error appears in the above-identified patent and that said Letters Patent is hereby corrected as shown below:

In the Specification

In Column 12, Line 25 add -- maximum deadline. -- after "below a"

Signed and Sealed this
Twenty-first Day of March, 2023

Katherine Kelly Vidal
*Director of the United States Patent and Trademark Office*